(12) United States Patent  (10) Patent No.: US 8,549,438 B2
Kodimer  (45) Date of Patent: Oct. 1, 2013

(54) SPLIT MODE COMMAND BUTTON

(75) Inventor: Marianne Kodimer, Huntington Beach, CA (US)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 307 days.

(21) Appl. No.: 13/015,342

(22) Filed: Jan. 27, 2011

(65) Prior Publication Data

US 2011/0258571 A1    Oct. 20, 2011

Related U.S. Application Data

(60) Provisional application No. 61/324,474, filed on Apr. 15, 2010.

(51) Int. Cl.
*G06F 13/00* (2006.01)
*G06F 15/00* (2006.01)

(52) U.S. Cl.
USPC .......................................... 715/841; 715/781

(58) Field of Classification Search
USPC ................. 715/840–841, 207, 771, 834, 850, 715/851–853, 781
See application file for complete search history.

(56) References Cited

U.S. PATENT DOCUMENTS

2003/0098891 A1* 5/2003 Molander ...................... 345/841
2005/0004926 A1* 1/2005 Ohtani .......................... 707/100

* cited by examiner

*Primary Examiner* — Cao "Kevin" Nguyen
(74) *Attorney, Agent, or Firm* — SoCal IP Law Group LLP; Steven C. Sereboff; Jonathan Pearce

(57) ABSTRACT

Systems and methods for control of a split mode command button are disclosed. The method includes displaying a button to a user, the button including a primary function area incorporating a primary function available for immediate selection and a secondary function area incorporating a drop-down menu of at least one secondary function. The method further includes accepting a selection of a secondary function and executing the secondary function. The method also includes updating the button such that the secondary function is associated with the primary function area and the primary function is associated with the secondary function area and displaying the updated split mode command button to a user.

18 Claims, 6 Drawing Sheets

SPLIT MODE COMMAND BUTTON

RELATED APPLICATION INFORMATION

This patent claims priority from U.S. patent application No. 61/324,474 entitled "Split Mode Command Button" filed Apr. 15, 2010.

BACKGROUND

1. Field

This disclosure relates to user interfaces.

2. Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as a document, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may also provide remote document processing services to external or network devices.

User interfaces are used in every user to computer interaction. One type of interaction, typically undertaken by system administrators is user management. User management is necessary in the corporate or other organization's networks in order to maintain security of physical and electronic documents. A user login or user pin may be required before access to an MFP is granted. Various functions of an MFP may be disabled for some users and enabled for others.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Systems and methods for control of a split mode command button are disclosed. The method includes displaying a button to a user, the button including a primary function area incorporating a primary function available for immediate selection and a secondary function area incorporating a drop-down menu of at least one secondary function. The method further includes accepting a selection of a secondary function and executing the secondary function. The method also includes updating the button such that the secondary function is associated with the primary function area and the primary function is associated with the secondary function area and displaying the updated split mode command button to a user.

Description of Apparatus

Figure 1:
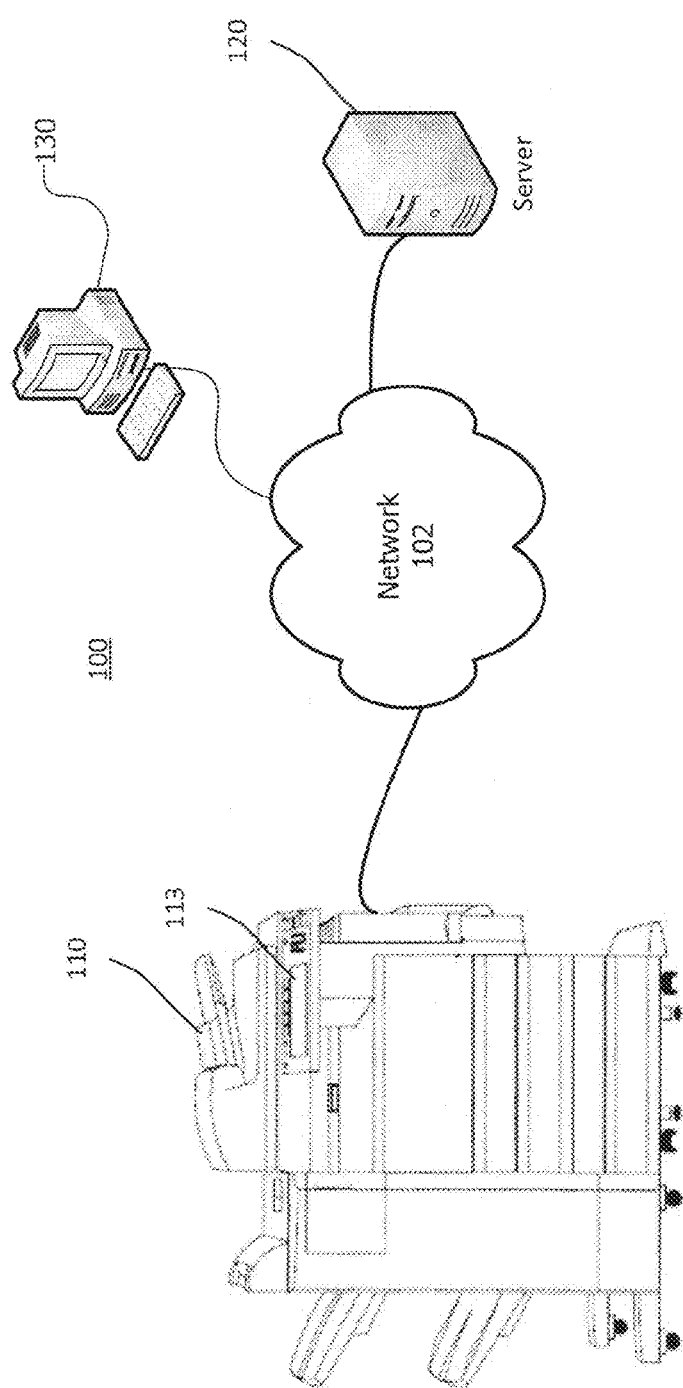
FIG. 1 is a diagram of an MFP system.

Referring now to FIG. 1 there is shown an MFP system 100. The system 100 includes an MFP 110, a server 120, and a client computer 130, all interconnected by a network 102. The system 100 may be implemented in a distributed computing environment and interconnected by the network 102.

The network 102 may be a local area network, a wide area network, a personal area network, the Internet, an intranet, or any combination of these. The network 102 may have physical layers and transport layers according to IEEE 802.11, Ethernet or other wireless or wire-based communication standards and protocols such as WiMax, Bluetooth, the public switched telephone network, a proprietary communications network, infrared, and optical.

The MFP 110 may be equipped to receive portable storage media such as USB drives. The MFP 110 includes a user interface 113 subsystem which communicates information to and receives selections from users. The user interface subsystem 113 has a user output device for displaying graphical elements, text data or images to a user and a use input device for receiving user inputs. The user interface subsystem 113 may include a touchscreen, LCD display, touch-panel, alphanumeric keypad and/or an associated thin client through which a user may interact directly with the MFP 110.

The server 120 is software operating on a server computer connected to the network. The client computer 130 may be a PC, thin client or other device. The client computer 130 is representative of one or more end-user devices and may be considered separate from the system 100.

Figure 2:
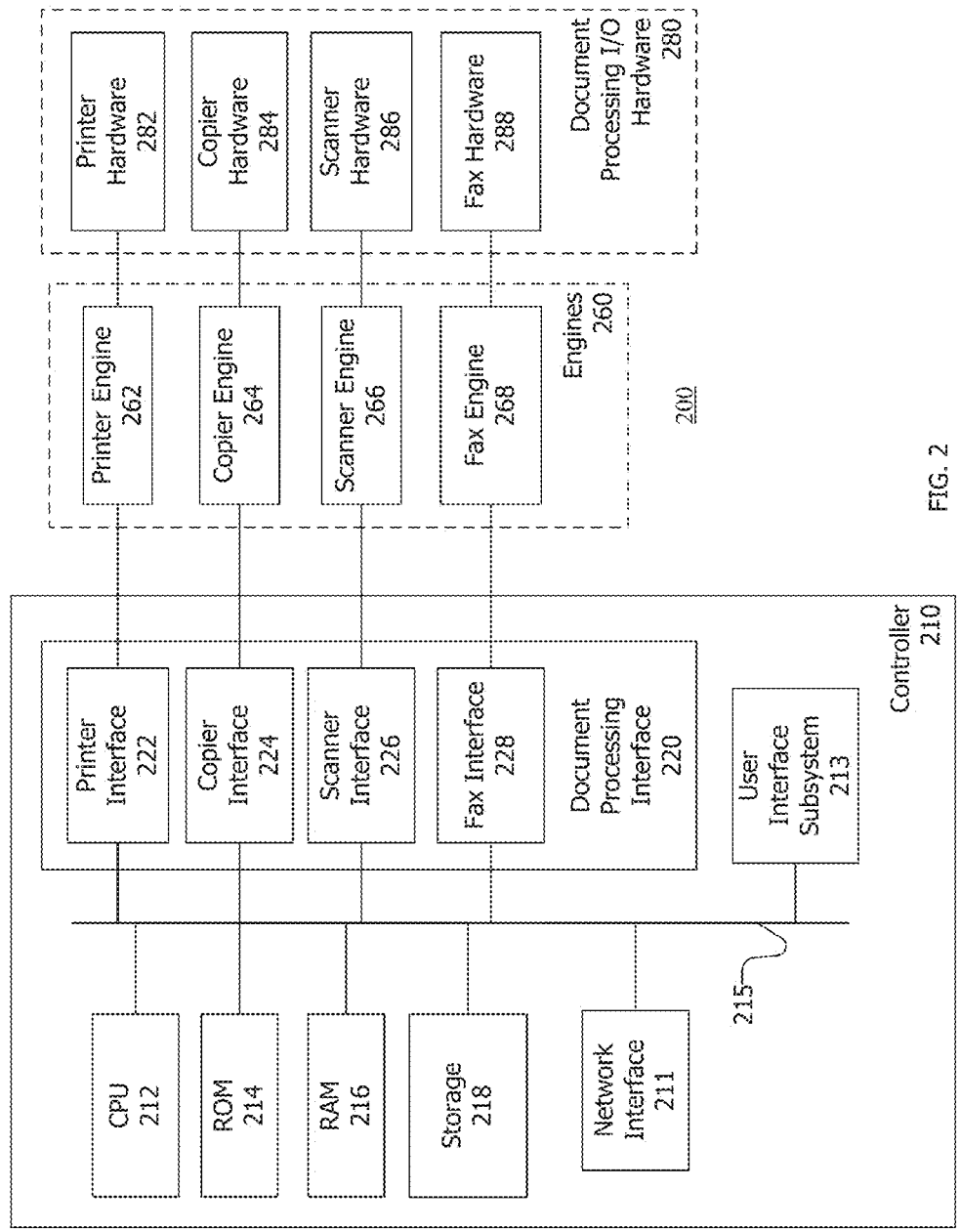
FIG. 2 is a block diagram of an MFP.

Turning now to FIG. 2 there is shown a block diagram of an MFP 200 which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
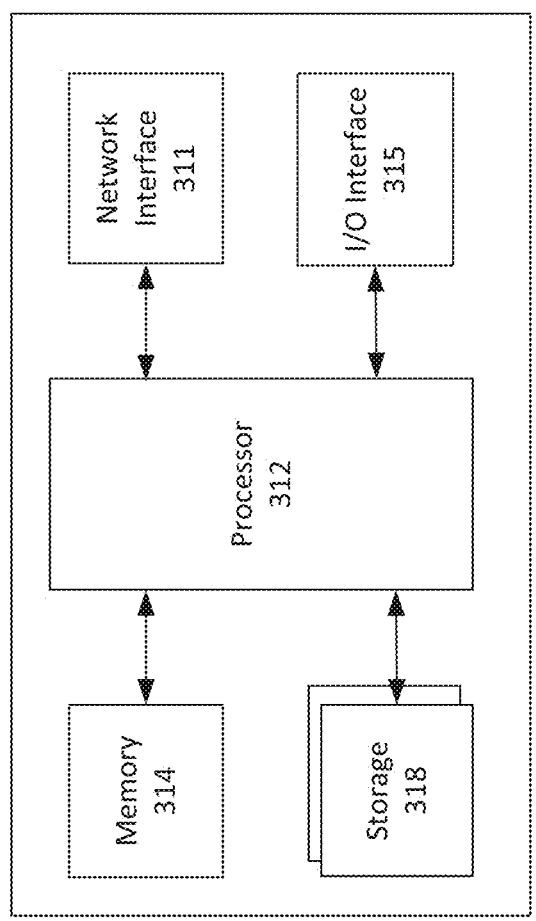
FIG. 3 is a block diagram of a computing device.

Turning now to FIG. 3 there is shown a computing device 300, which is representative of the server computers, client devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, field programmable gate arrays (FPGAs), application specific integrated circuits (ASICs), programmable logic devices (PLDs) and programmable logic arrays (PLAs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

Figure 4:
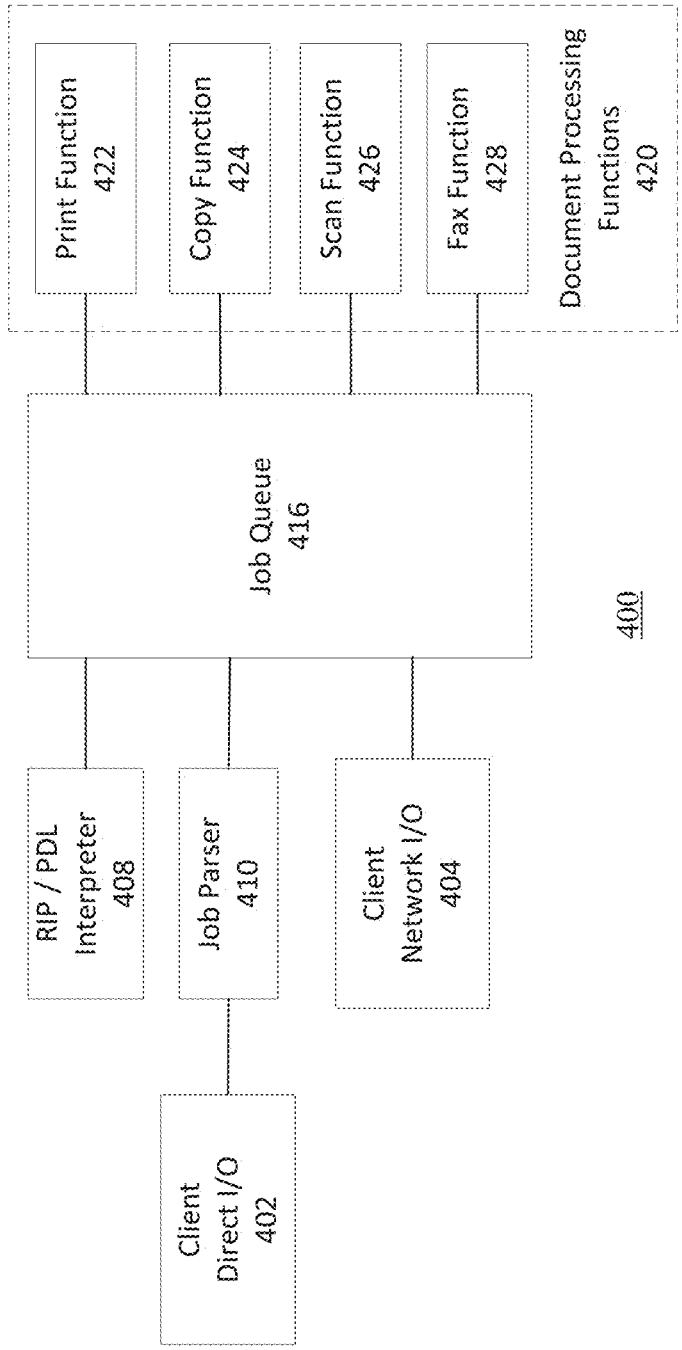
FIG. 4 is a block diagram of a software system for an MFP.

Turning now to FIG. 4 there is shown a block diagram of a software system 400 of an MFP which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 420 enables the MFP to print documents and implements each of the various functions related to that process. These include stapling, collating, hole punching, and similar functions. The copy function 422 enables the MFP to perform copy operations and all related functions such as multiple copies, collating, 2 to 1 page copying or 1 to 2 page copying and similar functions. Similarly, the scan function 424 enables the MFP to scan and to perform all related functions such as shrinking scanned documents, storing the documents on a network or emailing those documents to an email address. The fax function 426 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Turning now to FIGS. 5-8 there is shown a series of views of a split mode command button. The split mode command button includes a primary function area 502 and a secondary function area 504.

The split mode command button may appear as a part of a user interface on a computing device (FIG. 3), such as a client computer or thin client, or a MFP (FIG. 1) as a part of a MFP user interface subsystem 213 (FIG. 2). In particular, the split mode command button may appear as a part of an interface used by an administrator of MFPs to create settings for the device or for individuals or groups of users of a device. As an administrator is creating user accounts for a MFP or a group of MFPs, the split mode command button may be displayed.

Figure 5:
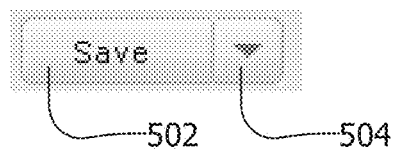
FIG. 5 is a split mode command button.

Selecting the primary function area 502 may instruct the software to execute the primary function, such as "save" shown in FIG. 5. Selecting the secondary function area 504 may instruct the software to display secondary functions.

Figure 6:
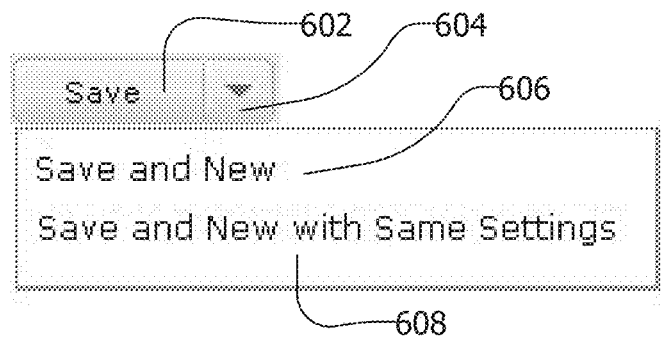
FIG. 6 is a split mode command button showing available alternate functions.

Turning now to FIG. 6 there is shown a split mode command button showing available secondary functions. The split mode command button includes a primary function 602, a secondary function area 604 and two secondary functions 606 and 608.

Once a user has selected the secondary function area 504 (FIG. 5), the primary function 602 is still displayed, but selecting the secondary function area 604 has caused two secondary functions 606, 608 to be displayed. Selecting either of the secondary functions 606, 608 will instruct the processor to execute those secondary functions.

The second secondary function 608 entitled "Save and New with Same Settings" will save the open document or form being worked on to a storage location and then create a new document or form with all of the same settings, excluding unique settings. Unique settings may include username, password, address, phone number or any other uniquely identifiable setting. This feature may be particularly useful, for example, when an administrator of an MFP, network system or similar system is in the process of creating a large number of similar user accounts.

If a large number of users are to be given the same security settings and access to an MFP, group of MPFs or similar system, then this function will enable that administrator to more quickly create a number of user accounts. Similarly, if a large number of virtually identical documents incorporating a few unique elements are to be created, this function will enable a user to quickly create those documents.

Figure 7:
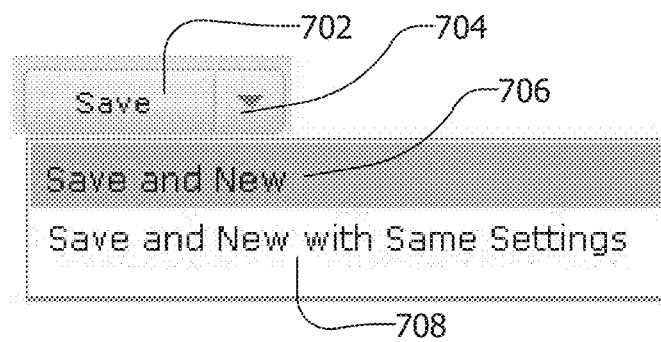
FIG. 7 is a split mode command button having a selection of the first of the available alternate functions.

Turning now to FIG. 7 there is shown a split mode command button having a selection of the first of the available alternate functions. The primary function 702 and the secondary function area 704 are visible along with secondary functions 706 and 708. The first secondary function 706 has been selected by a user as shown by the darker shading. The selected first secondary function 706 is "Save and New".

Figure 8:
FIG. 8 is a split mode command button with an updated button label.

Turning now to FIG. 8 there is shown a split mode command button with an updated button label. FIG. 8 is displayed after the user has selected the secondary function 706. The primary function 802 and secondary function area 804 are displayed. However, the primary function 802 is now updated to the "Save and New" function selected in FIG. 7.

The secondary function area 804 remains. Selecting the secondary function area 804 will result in display of two secondary functions, "Save" and "Save and New with Same Settings". The split mode command button has been updated based upon the user selection of the first secondary setting in FIG. 7.

Description of Processes

Figure 9:
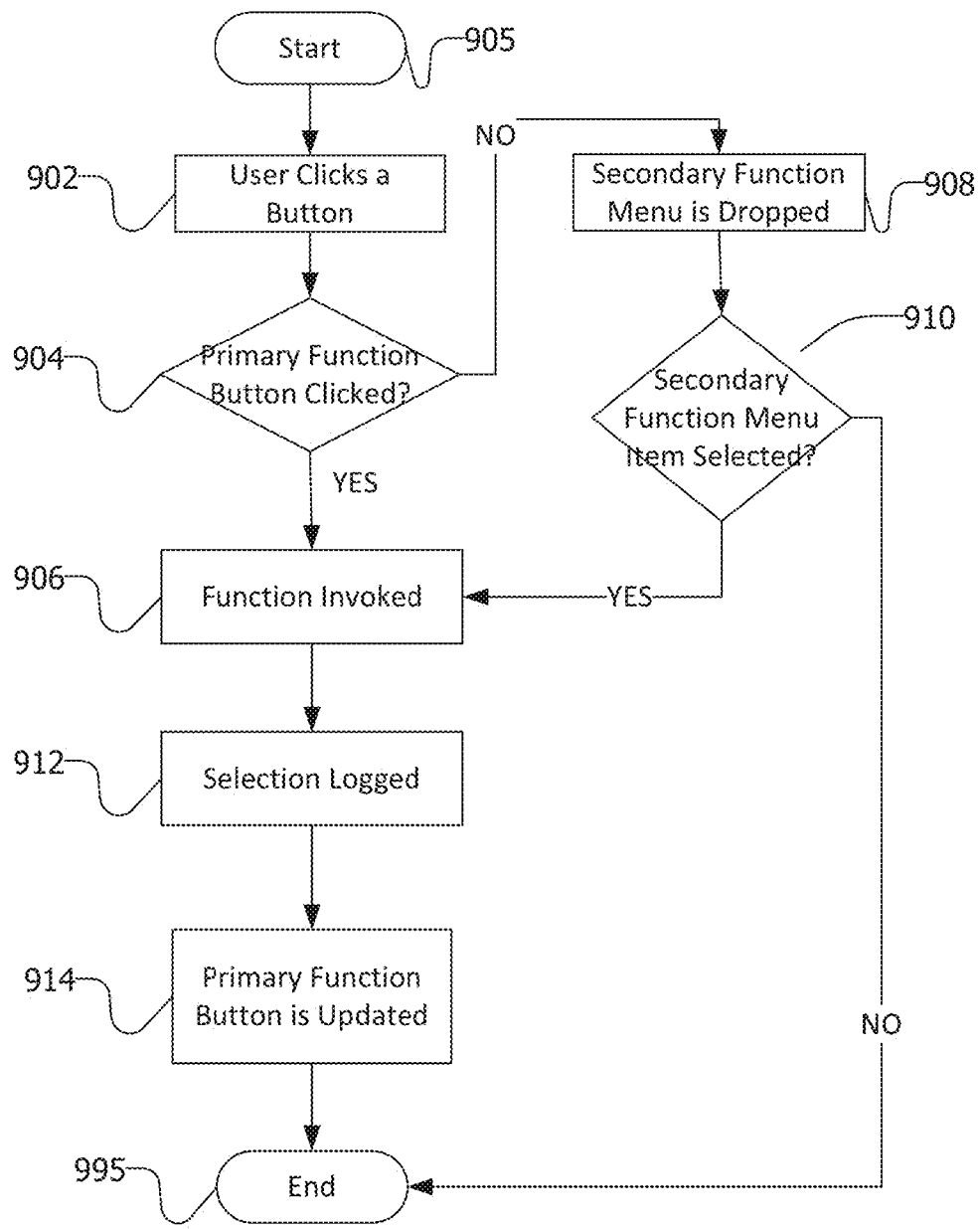
FIG. 9 is a flowchart for the operation of the split mode command button.

Turning now to FIG. 9, there is shown a flowchart for the operation of the split mode command button. The first step in the process is for a user to click the split mode command button 902. This click may either be to the primary function area 502 (FIG. 5) or to the secondary function area 504. If the primary button function is clicked 904, then the primary function is invoked 906. If the primary function button is not clicked, then this means that the secondary function area 504 has been selected and, as a result a menu is dropped 908. This menu includes each of the secondary functions.

If a user selects a secondary function menu item, then the associated secondary function is invoked 906. If no secondary function menu item is selected, then the menu that was dropped may timeout and revert to the default state. Alternatively, the menu may remain available for selection, along with the primary function. No function is invoked until a user makes a selection of one of the primary or secondary functions.

After the function is invoked 906, the user's selection is logged 912. This log may be stored locally in the client computer or multifunction peripheral or may be stored on a remote server, such as a server used to store user accounts associated with a multifunction peripheral or a network system. The log may be used to maintain and track historical usage of primary and secondary functions. The log may be maintained on a per-user basis or on an aggregate basis. A per user log will enable the split mode command button to be altered according to aggregate use of the primary and secondary functions associated with the split mode command button.

Next, the primary function button is updated to incorporate the selection of the user. The primary function may be updated each time a user selects a different function. The most recent selection made by a user from among the primary and secondary functions would become the primary function for the next user interaction.

Alternatively, the primary function may be updated only based upon historical usage of each of the functions associated with the split mode command button. The primary function would remain the same until one of the secondary functions surpassed the current primary function in number of total uses or some other measure of probability of primary use. The primary function may also be set based upon the historical use of each function at a particular time of day, day of the week, or other similar measure.

In yet another alternative, the primary function may be updated only based upon historical usage of each of the functions of the split mode command button by a particular user. The primary function would update in a similar way to the historical usage data described above, but on a per user basis. The identity of a user may be known by a multifunction peripheral, network system or other similar system based upon a login, token or other key required for access.

The flow chart of FIG. 9 has both a start 905 and an end 995, but the process is cyclical in nature. Portions of the process may be accomplished in parallel or in serial. Multiple instances of the process may be taking place in parallel or in serial.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for providing a user interface comprising:
    displaying a button to a user, the button including a primary function area showing a primary function available for immediate selection and a secondary function area showing an actuator for a drop-down menu including at least one secondary function;
    accepting a selection of a secondary function from the drop-down menu;
    executing the secondary function;
    updating the button, in response to the user's most recent selection of the secondary function using the button, such that the secondary function replaces the primary function in the primary function area and the primary function is moved to the drown-down menu; and
    displaying the updated button to the user.

2. The method of claim 1 wherein the button is updated in response to the user's most recent selection of the secondary function and based upon historical usage data of the secondary function.

3. The method of claim 2 wherein the historical usage data indicates that the secondary function is selected more than any other function.

4. The method of claim 1 wherein the button is updated in response to the user's most recent selection of the secondary function and based upon historical usage data of the secondary function by a particular user.

5. The method of claim 1 wherein executing the secondary function further comprises:
    saving settings associated with a form;
    creating a new form incorporating the settings, excluding unique settings, associated with the form; and
    making the new form available for editing by the user.

6. The method of claim 1 implemented in a processor and associated memory in a multifunction peripheral.

7. An apparatus, including a processor and associated memory, the apparatus including software that when executed by the processor causes the processor to:
    display a button to a user, the button including a primary function area showing a primary function available for immediate selection and a secondary function area showing an actuator for a drop-down menu including at least one secondary function;
    accept a selection of a secondary function from the drop-down menu;
    execute the secondary function;
    update the button, in response to the user's most recent selection of the secondary function using the button, such that the secondary function replaces the primary function in the primary function area and the primary function is moved to the drop-down menu; and
    display the updated button to the user.

8. The apparatus of claim 7 wherein the button is updated in response to the user's most recent selection of the secondary function using the button and based upon historical usage data of the secondary function.

9. The apparatus of claim 8 wherein the historical usage data indicates that the secondary function is used more than any other function.

10. The apparatus of claim 7 wherein the button is updated in response to the user's most recent selection of the secondary function using the button and based upon historical usage data of the secondary function by a particular user.

11. The apparatus of claim 7 wherein the secondary function actuates instructions that further cause the processor to:
    save settings associated with a form;
    create a new form incorporating the settings, excluding unique settings, associated with the form; and
    make the new form available for editing by the user.

12. The apparatus of claim 7 wherein the processor and associated memory are incorporated in a multifunction peripheral.

13. The apparatus of claim 7 wherein the processor and associated memory are incorporated in a thin client associated with a multifunction peripheral.

14. The apparatus of claim 13 wherein the button is updated in response to the user's most recent selection of the secondary function using the button and based upon historical usage data of the secondary function.

15. The apparatus of claim 14 wherein the historical usage data indicates that the secondary function is used more than any other function.

16. The apparatus of claim 13 wherein the button is updated in response to the user's most recent selection of the secondary function using the button and based upon historical usage data of the secondary function by a particular user.

17. Apparatus comprising a storage medium storing a program having instructions which when executed by a processor will cause the processor to:
   display a button to a user, the button including a primary function area showing a primary function available for immediate selection and a secondary function area showing an actuator for a drop-down menu of at least one secondary function;
   accept a selection of a secondary function from the drop-down menu;
   execute the secondary function;
   update the button, in response to the user's most recent selection of the secondary function using the button, such that the secondary function replaces the primary function in the primary function area and the primary function is moved to the drop-down menu; and
   display the updated button to the user.

18. The apparatus of claim 17 wherein the storage medium and the processor are used by a multifunction peripheral device.

* * * * *